March 16, 1954  A. H. DICKINSON  2,672,284
ELECTRONIC MEASURING AND INDICATING DEVICE
Filed Sept. 7, 1949  10 Sheets-Sheet 1

INVENTOR
ARTHUR H. DICKINSON
BY
AGENT

March 16, 1954     A. H. DICKINSON     2,672,284
ELECTRONIC MEASURING AND INDICATING DEVICE
Filed Sept. 7, 1949     10 Sheets-Sheet 6

INVENTOR
ARTHUR H. DICKINSON
BY
*Charles C. McTiernan*
AGENT

March 16, 1954     A. H. DICKINSON     2,672,284
ELECTRONIC MEASURING AND INDICATING DEVICE
Filed Sept. 7, 1949     10 Sheets-Sheet 8

INVENTOR
ARTHUR H. DICKINSON
BY Charles E. McTiernan
AGENT

March 16, 1954    A. H. DICKINSON    2,672,284
ELECTRONIC MEASURING AND INDICATING DEVICE
Filed Sept. 7, 1949    10 Sheets-Sheet 9

INVENTOR
ARTHUR H. DICKINSON
BY
Charles E. McTiernan
AGENT

March 16, 1954  A. H. DICKINSON  2,672,284
ELECTRONIC MEASURING AND INDICATING DEVICE
Filed Sept. 7, 1949  10 Sheets-Sheet 10

INVENTOR
ARTHUR H. DICKINSON
BY
AGENT

Patented Mar. 16, 1954

2,672,284

UNITED STATES PATENT OFFICE 2,672,284

ELECTRONIC MEASURING AND INDICATING DEVICE

Arthur H. Dickinson, Greenwich, Conn., assignor to International Business Machines Corporation, New York, N. Y., a corporation of New York Application September 7, 1949, Serial No. 114,321

16 Claims. (Cl. 235—61)

This invention relates to an electronic system for measuring the magnitudes of continuous non-digital variables and for manifesting such measurements in digital form.

The main object of the invention is to provide a system for measuring non-digital magnitudes and for manifesting such measurements in digital form.

Another object of the invention is to provide a system for converting a non-digital magnitude onto a timed basis and for comparing such timed basis against a standard timed basis to produce a manifestation of the non-digital magnitude in digital form.

A further object of the invention is to provide a system for determining the magnitudes of varying forces or displacements and of manifesting such magnitudes either as instantaneous or average values.

A still further object of the invention is to provide a system for measuring the magnitudes of a non-digital quantity and for manifesting such magnitudes in digital form according to a functional relationship.

Another object of the invention is to provide a system for measuring the magnitudes of a non-digital independent quantity and for manifesting such magnitudes in digital form as a dependent quantity.

Other objects of the invention will be pointed out in the following description and claims and illustrated in the accompanying drawings, which disclose, by way of example, the principle of the invention and the best mode, which has been contemplated, of applying that principle.

The invention is applicable to all those fields of endeavor wherein it is necessary to determine the magnitude of a varying phenomena or condition and to produce a manifestation of such in digital form. The varying phenomena, in the form of a varying potential, is applied to a controlled oscillator which induces a linear change in the frequency of the oscillator with respect to the aforementioned potential. This controllable oscillator shall be described sufficiently for an understanding of its use in this invention inasmuch as it is described and claimed in the copending application Serial No. 109,434, filed August 10, 1949, now Patent No. 2,598,516. The resulting impulses due to the change in frequency are applied to a result electronic counter under the control of a gating circuit. A second oscillator having a fixed frequency equal to the frequency of the controlled oscillator applies impulses under the control of the gating circuit to a standard electronic counter.

It is to be noted that the invention is not restricted to the operating condition of equal values of frequency for the two oscillators since the frequency of the second oscillator can be of any value inasmuch as by adjusting the frequency thereof it is possible to introduce a factor between what is measured and what is to be attained.

A measuring cycle is initiated by resetting the result counter to an original indicating condition and then energizing the gating circuit such that the impulses from the controlled and fixed oscillators may be applied simultaneously to the respective counters thereof. These impulses are counted accumulatively by the result and standard counters, respectively. When a number of impulses equal to a predetermined amount has been entered in the standard counter, the gating circuit is cut off thus terminating the measuring cycle. During the period of time required to register the predetermined count in the standard counter a definite number of impulses will have been entered into and registered by the result counter. The total number so registered in the result counter is the digital value of the varying phenomena being measured. After reading the result counter, it is reset and ready for another measuring cycle, which cycle can be initiated either manually or automatically.

Figure 1:
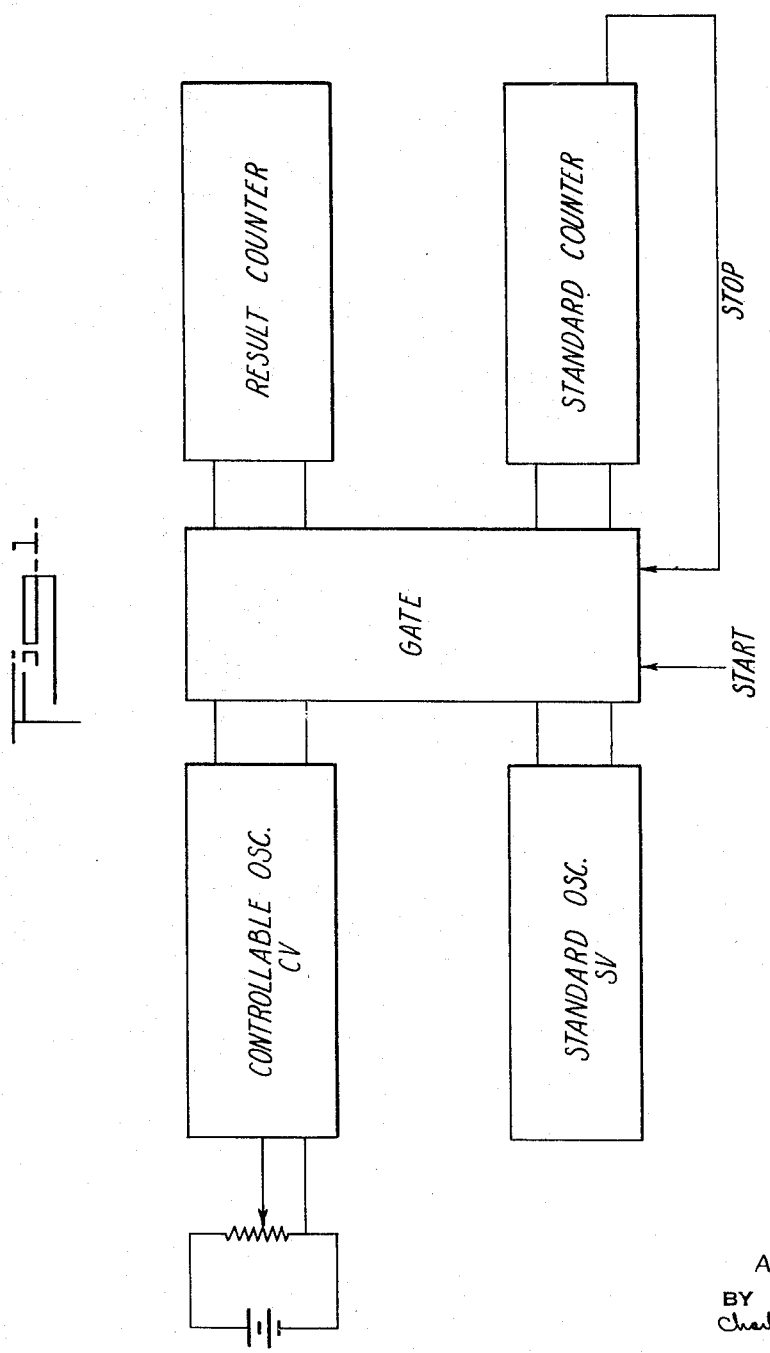
Fig. 1 represents a schematic diagram of the complete system of the invention.

Reference is now made to the drawings for a more specific description of the invention. In Fig. 1 there is shown the general layout and circuit connections between the various devices of the system.

Figure 2:
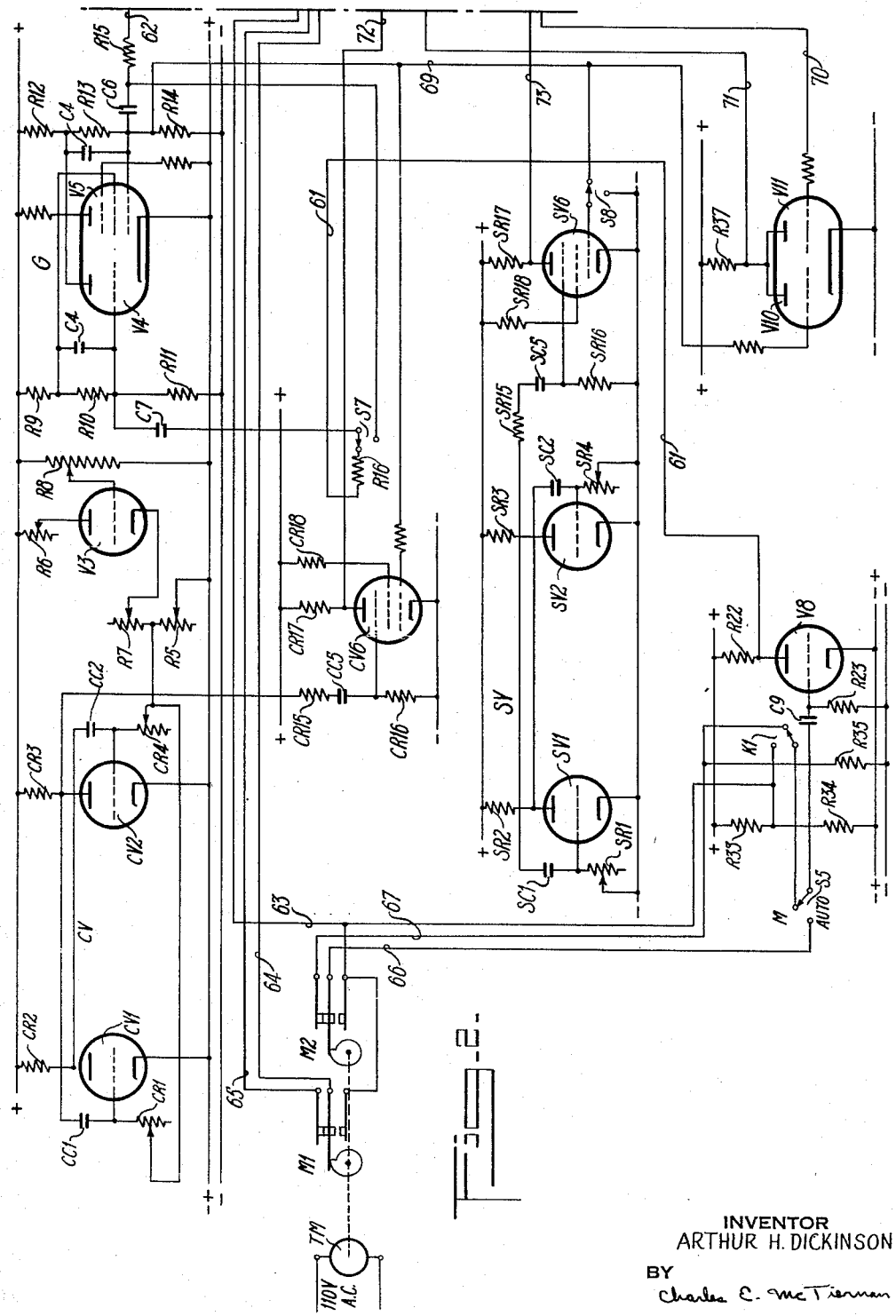
Fig. 2 represents the circuit diagram of that part of the system relating to the controllable oscillator, the standard oscillator and the gating circuit.

Referring to Fig. 2, there is shown therein the circuit connections existing between the controllable oscillator CV and the associated gate circuit CV6, the standard oscillator SV and the gate circuit SV6 associated therewith and the trigger circuit G which controls the functioning of the gate circuits CV6 and SV6.

The controllable oscillator circuit, which has been fully described and claimed in my aforementioned copending application, comprises two positively biased electron discharge devices or tubes CV1 and CV2 with the anode of each tube respectively cross-coupled to the control grid of the other tube, a control tube V3 and a resistor R8. The resistor R8, which is only representative of a source of voltage due to a varying quantity, is coupled to the grid of the control tube V3 which, in turn, controls the bias of the tubes CV1 and CV2. A variation in the magnitude of the varying quantity induces a change in the potential being applied to the grid of the control tube V3 thus varying the bias of the tubes CV1 and CV2 resulting in a change of frequency of the oscillator CV. The change in frequency of CV is linear with respect to the potential applied to the grid of the control grid V3. The rate of change in the oscillation frequency per volt change in the absolute grid voltage of control tube V3 is defined as the control ratio and is a function of the values of the resistors R5, R6, R7 and the transconductance of V3.

The standard or fixed oscillator SV comprises the tubes SV1 and SV2 connected in the well known multivibrator circuit arrangement.

The gating circuit comprises the trigger G and a pair of gates in the form of the pentodes CV6 and SV6 which control the application of the impulses from the oscillators CV and SV to the respective counters thereof. The trigger G includes a pair of electron tubes V4 and V5 wherein the former tube is a triode and the latter tube is a pentode. The screen of the pentode V5 is cross-coupled to the grid of the tube V4 through an impedance network comprising a capacitor C4 and a resistor R10. The anode of the triode V4 is coupled to the grid of V5 through an impedance network comprising the capacitor C5 and the resistor R13. The control grid of each tube is connected through resistors R11 and R14, respectively, to the negative side of the bias power supply source while the common cathode of V4 and V5 is connected to the low side of the main power supply. To complete the gating circuit, the gating or blocking tubes CV6 and SV6 are connected to the trigger G. The control grids of the tubes CV6 and SV6 connect to the junction of resistors R13 and R14 through the medium of connecting line 69. Thus it is noted that the functioning of the tubes CV6 and SV6 is dependent upon the operation of the trigger G. The anodes of CV6 and SV6 connect to the high side of the main power supply through the resistors CR17 and SR17, respectively. The screen grids of CV6 and SV6 are also connected to the high side of the power supply through the resistors CR18 and SR18, respectively.

The output of the controlled oscillator CV is continuously applied to the suppressor grid of the normally blocked or closed tube CV6 through a circuit arrangement comprising the resistors CR15 and CR16 and the blocking condenser CC5. The output of the fixed or standard oscillator SV is continuously applied to the suppressor grid of the normally blocked or closed tube SV6 by a circuit arrangement comprising the resistors SR15 and SR16 and the blocking condenser SC5.

The trigger G has two stable or static conditions where one condition exists when the tube V4 is conducting while the tube V5 is non-conducting while the second condition is the reverse of the first condition. The normal position of the trigger circuit is that of being in an off or blocking condition with the trigger G being considered off when V4 is conducting and to be on when V5 is conducting. The condition of stability when V4 is conducting is first attained since the grid bias of V4 is substantially zero, inasmuch as the grid is substantially at the same voltage as the cathode of V4, resulting in a large current flow and a decrease in plate voltage for the tube V4. By properly choosing the resistors R13 and R14, the voltage drop across R13 is great enough to maintain the control grid of tube V5 sufficiently negative to hold V5 at cutoff. With V5 at cutoff, there is no current flow through V5 resulting in an increase of the screen voltage thereof of such a magnitude that the voltage drop across the resistor R10 does not force the grid of V4 below the cathode voltage. The second condition of stability is attained by supplying a tripping pulse from a suitable source such as shall be discussed subsequently and applying it to the circuit. For example, a steep positive pulse may be applied through the resistor R15 and condenser C6 to resistor R14 and the grid of V5. This pulse being of sufficient amplitude will increase the voltage across R14 and reduce the negative grid bias of V5 to less than cutoff. The reduction of the grid bias of V5 to less than cutoff causes current to flow through V5 resulting in a decrease of the screen voltage of V5 and a decrease in the grid voltage of V4 to beyond cutoff whereby V4 is shut off. Thus the circuit has been tripped to the reverse static condition whereby V5 is conducting and V4 is non-conducting.

This new static state is maintained until a pulse is applied to trip the circuit to restore it to the normal off position. For example, a steep positive pulse may be applied through resistor R16 and condenser C7 to R11 and the control grid of V4 resulting in a decrease of the negative bias of V4 to less than cutoff. With the bias of V4 decreased to a value less than cutoff, V4 is rendered conductive resulting in a negative pulse being applied to the grid of V5 which shuts off V5. Thus it can be seen that positive triggering pulses applied successively to resistors R14 and R11 will effect successive reversals of the circuit state.

As mentioned previously, the functioning of the tubes CV6 and SV6 is dependent upon the status of the trigger G. When the trigger circuit is on, which is the condition of stability existing when V5 is conducting and V4 is non-conducting, the grid bias of tubes CV6 and SV7 is zero whereby the outputs from the oscillators CV and SV are freely applied to the result and standard counters, respectively. When the trigger circuit is off, which is the condition of stability existing when V4 is conducting and V5 is non-conducting, the grid bias of the tubes CV6 and SV6 is negative and of sufficient value to render each of the tubes non-conductive thus preventing the outputs from the oscillators CV and SV from being applied to the respective counters associated therewith.

From the foregoing, it is to be noted that when the gating circuit CV6 is opened, square wave impulses having a frequency corresponding to that of the controlled oscillator CV are produced across the anode resistor CR17 of the tube CV6. Likewise, when the gate SV6 is opened, square wave impulses having a frequency corresponding to that of the standard oscillator SV are produced on the anode resistor SR17 of the tube SV6. When each of the gates CV6 and SV6 are off, the control grid bias of the tubes CV6 and SV6 is such as to maintain these tubes at cutoff resulting in no impulses being produced on the anode resistors of each tube even though the impulses derived from the controlled and fixed oscillators are continuously applied to the suppressor grids of CV6 and SV6. The manner in which the impulses produced on CR17 and SR17 are employed will now be discussed.

The impulses produced on CR17 and SR17 are fed to a result and standard electronic counter, respectively, by means of connecting lines 72 and 73. Each counter has six columns where each of the columns represents a units, tens, hundreds, thousandths, ten thousandths and hundred thousandths order, respectively. Each column of an electronic counter comprises four trigger circuits and inasmuch as each of the twelve columns is similar only the units order of the result counter shall be described.

Figure 3:
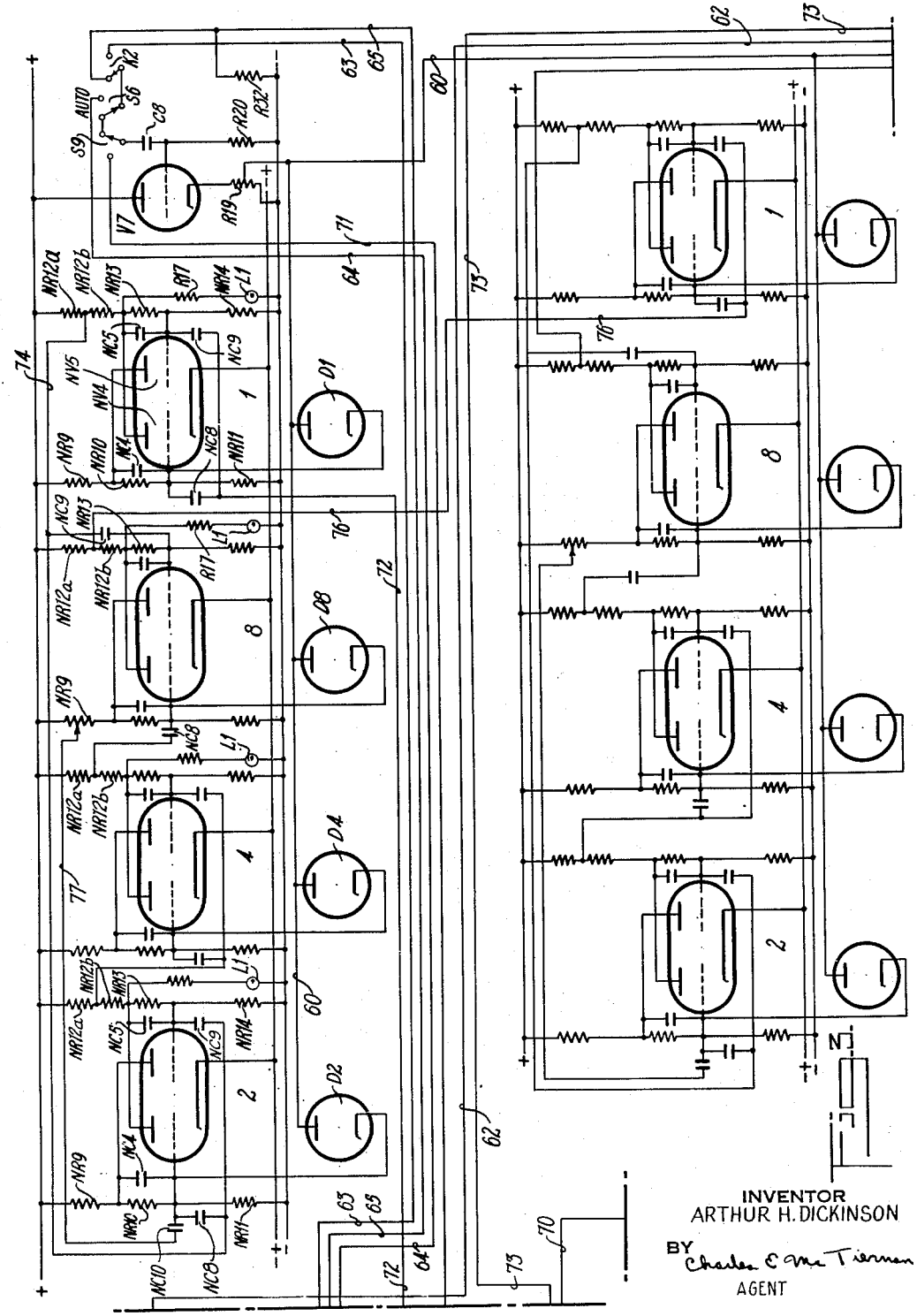
Fig. 3 represents a circuit arrangement showing the units and tens order of the result counter in addition to showing the circuit connections for resetting the result counter either automatically or manually.

With reference being made to Fig. 3, the column representing the units order comprises four trigger stages which are numbered 1, 2, 4, and 8 according to the binary notation system. The number assigned to each of the stages represents the number of pulses necessary to shift on the particular stage. The number 1 trigger stage comprises a pair of electron discharge devices or tubes NV4 and NV5 each having a common cathode coupled to the low or ground side of the main power supply source. While a duo-triode tube is shown it should be understood that a pair of triodes may also be employed without departing from the scope of the invention. The anode of each device is cross-coupled to the control grid of the other device through an impedance network comprising a resistor and a capacitor such as NR10 and NC4 and NR13 and NC5, respectively. The grid resistor of each device, such as NR11 and NR14, is connected between the respective grid thereof and the low side of the bias power supply source. The anode resistor of each device or tube NV4 and NV5, such as NR9 and the series resistors NR12a and NR12b, respectively, is connected between the positive side of the main power supply source and the junction of the impedance network associated therewith. The control grids of each tube are coupled together through the capacitors NC8 and NC9. The output from CV6 is applied by means of line 72 to two points of the number 1 trigger through the capacitors NC8 and NC9. The output from the number 1 trigger is tapped off at the junction of the resistors NR12a and NR12b and through the medium of the connecting line 74 applied to the number 2 trigger through the capacitors NC8 and NC9 coupled thereto. The circuit connections for the four trigger stages are substantially the same except for the difference in applying the output from the number 4 stage to the number 8 stage. The input to the number 8 stage is applied only to the left hand device through the capacitor NC8 coupled thereto while the output of the number 8 stage is applied to the number 1 trigger of the tens order by means of the line 76. The grid of the right hand device of the number 8 trigger is coupled to the number 2 trigger through the capacitor NC9 associated therewith and the line 74 for purposes to be subsequently described. For the purpose of indicating the condition of each stage a resistor R17 and neon lights L1 are connected intermediate the junction between the resistors NR12b and NR13 and the low side of the bias voltage power supply. When a trigger is on, the voltage drop across resistors NR13 and NR14 is sufficient to cause L1 to ignite. When the trigger is off, the neon light L1 remains extinguished. Thus the neon lights L1 manifest the on and off pattern of the trigger circuits thereby permitting visual reading of a count. While a neon light L1 and resistor R17 is only shown for each stage of the units order of the result counter, it should be understood that each stage of all the orders of the result and standard counter have coupled thereto a neon light for indicating purposes.

The aforementioned described circuit connections between the trigger circuits of the counter circuits produces a frequency division of impulses which are counted during the time when the triggers are in operation. For the first nine pulses applied to a column the trigger circuits operate in accordance with the binary notation system. On the tenth pulse, however, there is an automatic forced resetting of the trigger circuits which returns the trigger circuits to the original zero condition thereby maintaining cyclical operation of each counter column on a tens notational basis. Thus the on and off pattern of the four trigger circuits repeats for each ten pulses applied thereto.

In the actual operation of the result counter, the four trigger circuits of the units column are considered to be off when in a zeroized status. At the zeroized status of the trigger circuits, the left hand device of each trigger is conducting inasmuch as this device is zero biased when the proper value of NR11 is chosen while the right hand device of each trigger is non-conducting. The trigger circuits of the counter are considered to be on when the right hand device is conducting.

When the negative pulse produced in CR17 (Fig. 2) is concurrently applied to the two points of the trigger "1" of the units order (Fig. 3) there will be only a single shift thereof since the pulse will have no direct effect upon the non-conducting device. With the application of the first pulse on CR17 to the "1" trigger after the counter has been placed in a zeroized status by methods to be described subsequently, the left hand device will be rendered non-conducting and the right hand device conducting resulting in the igniting of the neon light associated therewith which indicates that the trigger is on. When the right hand device conducts a positive pulse is applied to the "2" trigger which due to the parameters thereof does not respond to positive pulses. The parameters of each trigger of the counter are such that they do not respond to positive impulses. With the application of the second pulse to the "1" trigger, the "1" trigger is tripped off and the "2" trigger is tripped on due to the negative pulse applied from the "1" trigger. The third and fourth impulses produced on CR17 cause a further on and off shift of trigger "1." As the "1" trigger shifts off upon the fourth pulse, the "2" trigger is tripped off which is accompanied by the "4" trigger being tripped on. The fifth and sixth impulses on CR17 cause a double shift of trigger "1" and a single shift to on status of trigger "2" with the "4" trigger retaining its on status. The seventh and eighth impulses from CR17 again causes trigger "1" to shift twice and the "2" and "4" triggers to shift off. On the eighth pulse the "8" trigger, which is coupled to the "4" trigger only through the capacitor NC8, shifts on. The ninth impulse derived from CR17 shifts on the "1" trigger while the "8" trigger is unaffected thereby and thus retains its on status.

The circuit connection 74 coupled to the junction of NR12a and NR12b of trigger "1" is also applied to the grid of the right hand device of the "8" trigger through the capacitor NC9. Thus when the tenth impulse is applied to the "1" trigger which shifts it off there results a negative impulse which when applied to the "8" trigger through the capacitor NC9 also shifts off the "8" trigger. The resistor NR9 of the "8" trigger is coupled through the line 77 to the left side of the "2" trigger through the capacitor NC10. Therefore as the "8" trigger shifts off, the voltage drop across its resistor NR9 decreases thereby producing a positive impulse to the left side of the "2" trigger. This positive impulse blocks the normal action of the negative pulse which is applied to the "2" trigger when the "1" trigger is shifted off whereby the "2" trigger is now blocked from switching. Thus on the tenth impulse all the triggers are restored to their original zero condition or zeroized status by a forced resetting of the triggers.

It is to be noted that the "1" trigger reverses its status for every impulse, that the "2" trigger reverses status for every four impulses applied to the "1" trigger or for every pair of negative pulses produced by the "1" trigger, that trigger "4" reverses its status for every eight impulses applied to the "1" trigger or for every pair of negative impulses produced by the "2" trigger and that the "8" trigger reverses once for every ten impulses fed to the "1" trigger.

Whenever a counter order passes from a count of 9 to 0, it is necessary that a count of 1 must be entered into the next higher counter order. To attain this result the right hand device of the "8" trigger of the prior order is coupled to the "1" trigger of the next higher order. Thus, when the tenth impulse is applied to the units order, the "8" trigger is tripped off resulting in a negative pulse being applied to the "1" trigger of the tens order.

Figure 6:
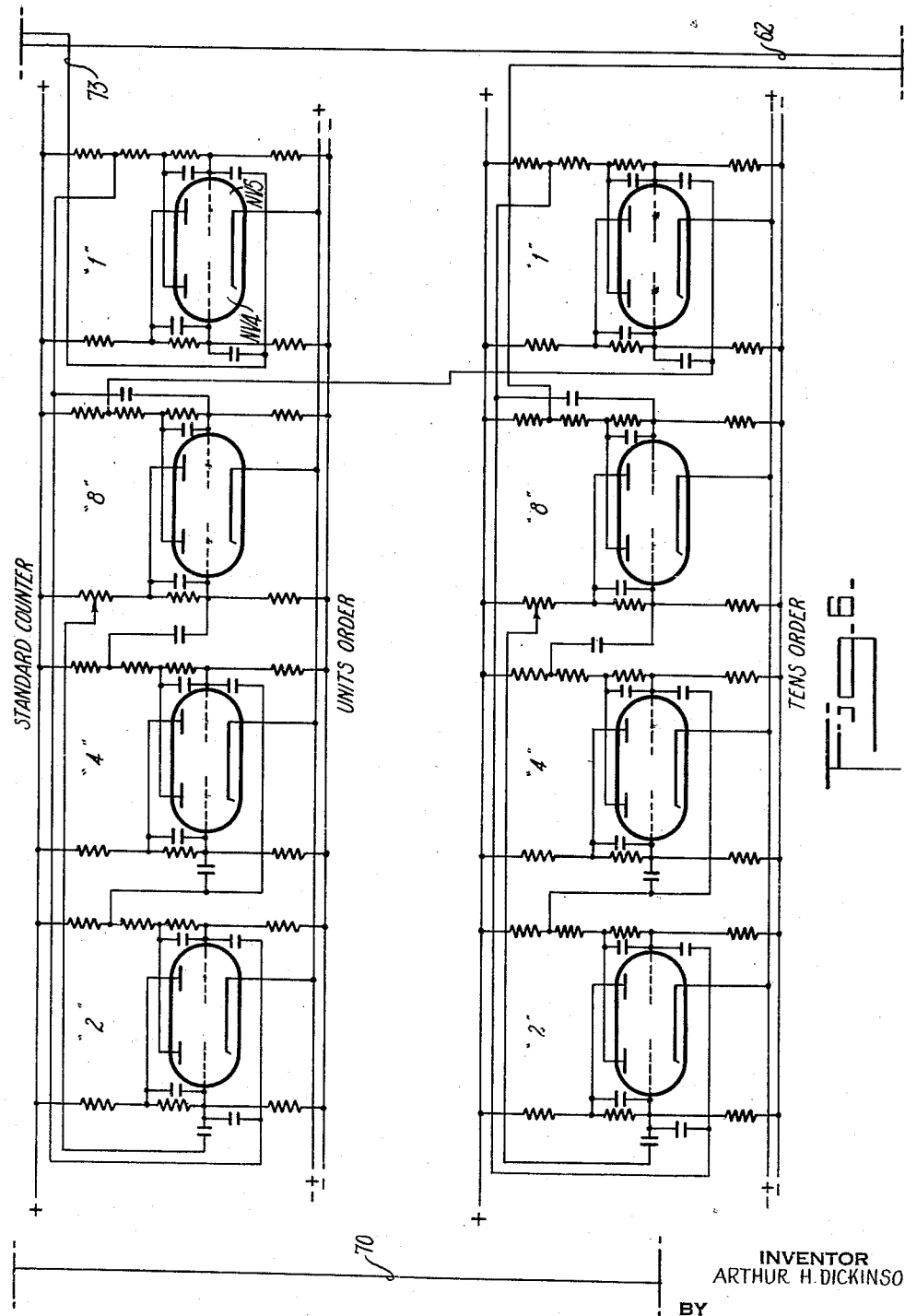
Fig. 6 represents a circuit arrangement showing the units and tens order of the standard counter.

The standard or fixed electronic counter is substantially similar to the result electronic counter except that it counts the impulses produced on the resistor SR17 of the tube SV6 (Fig. 2) and which impulses are applied to the "1" trigger of the units order as shown in Fig. 6 by the conductor 73.

Figure 7:
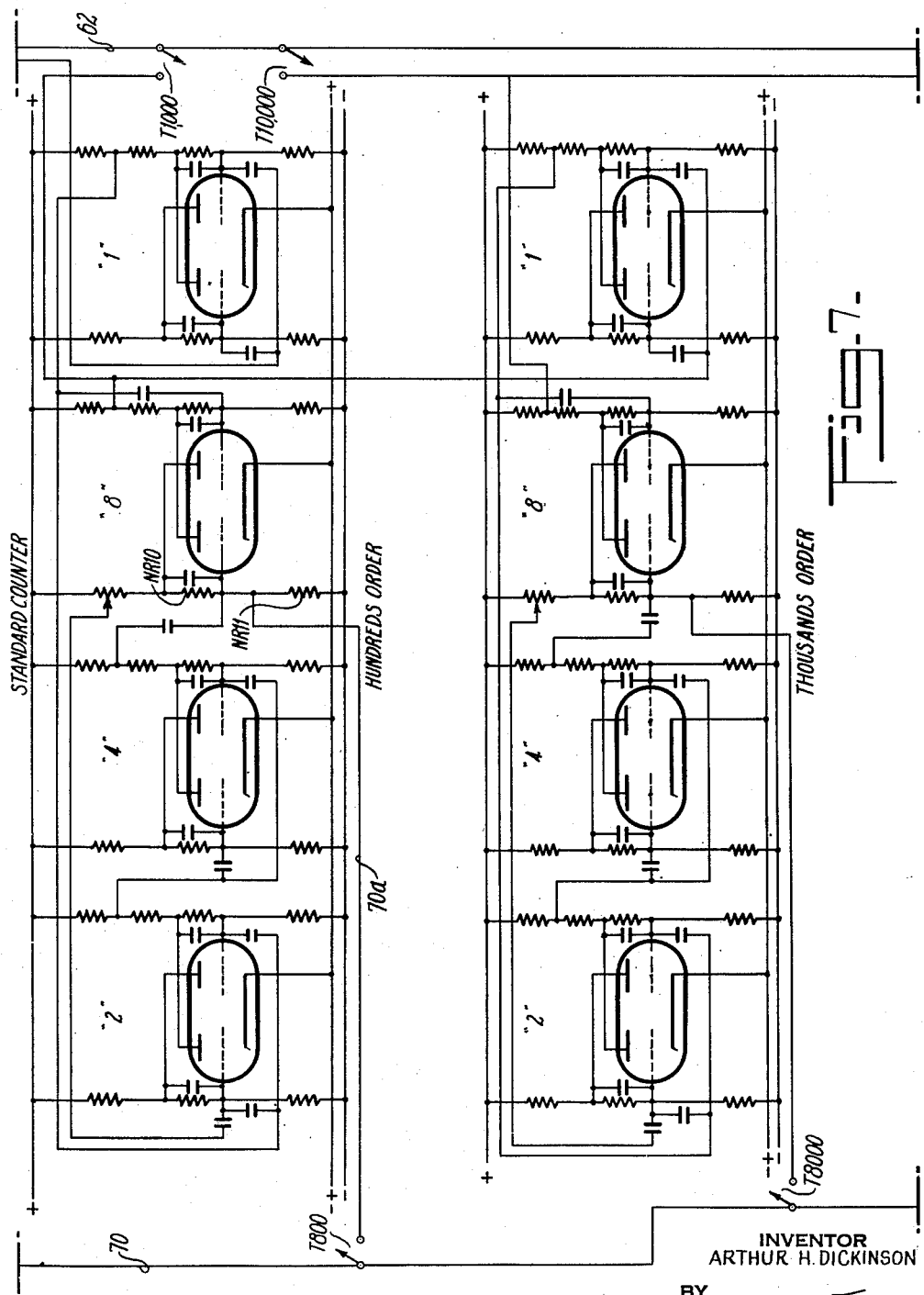
Fig. 7 represents a circuit arrangement showing the hundreds and thousandths order of the standard counter and further showing the various switching means employed to terminate the measuring cycle after a predetermined time.
Figure 8:
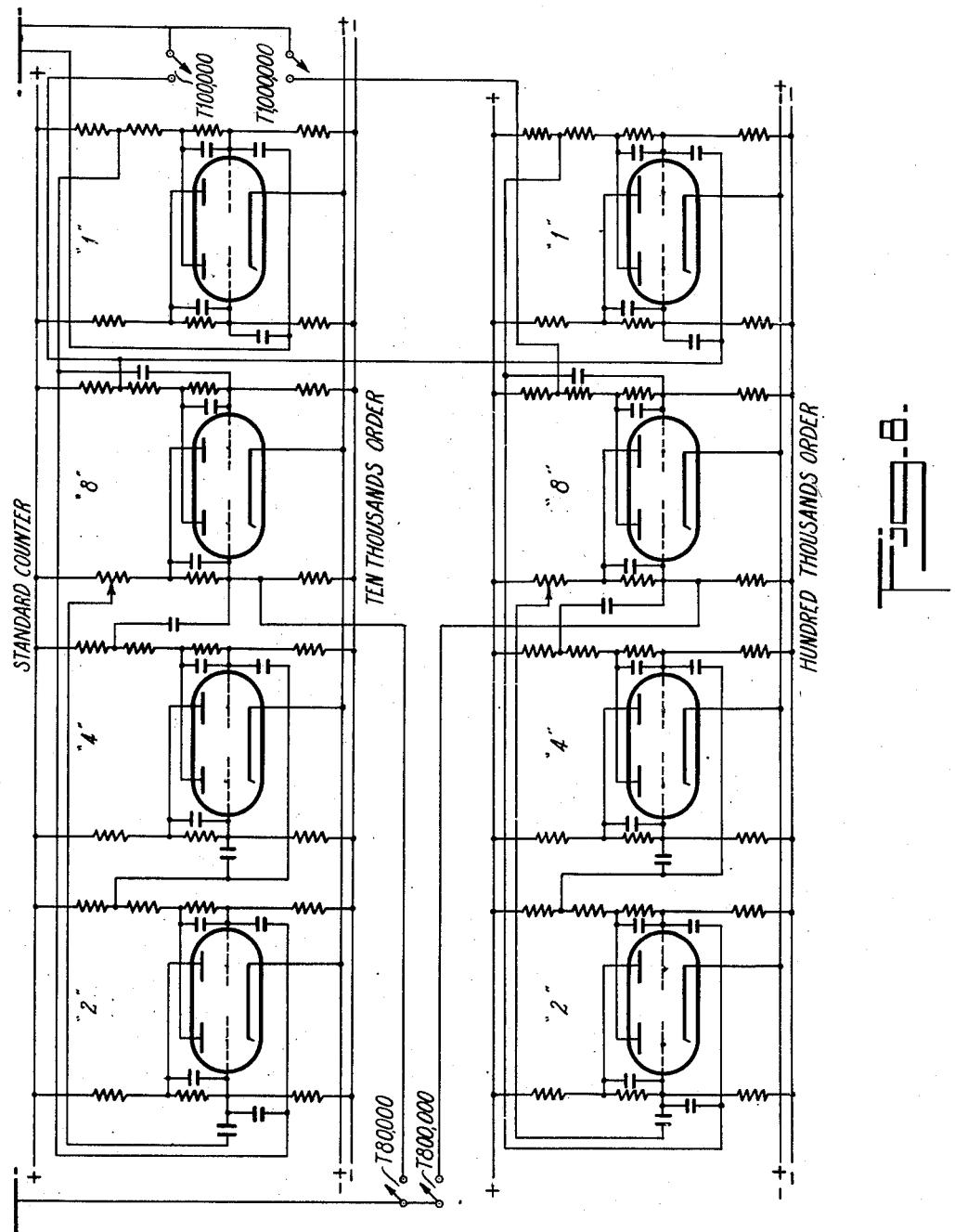
Fig. 8 represents a circuit arrangement showing the thousandths and hundred thousandths orders of the standard counter.

The units and tens order of the standard counter are shown in detail in Fig. 6 while the hundreds and thousands order are shown in Fig. 7 with the ten thousandths and hundred thousandths order being shown in Fig. 8. Each order comprises four trigger circuits which are numbered 1, 2, 4 and 8 according to the binary notation system. The circuit connections between adjacent triggers as well as adjacent orders is substantially the same as has been described with respect to the result counter.

Figure 4:
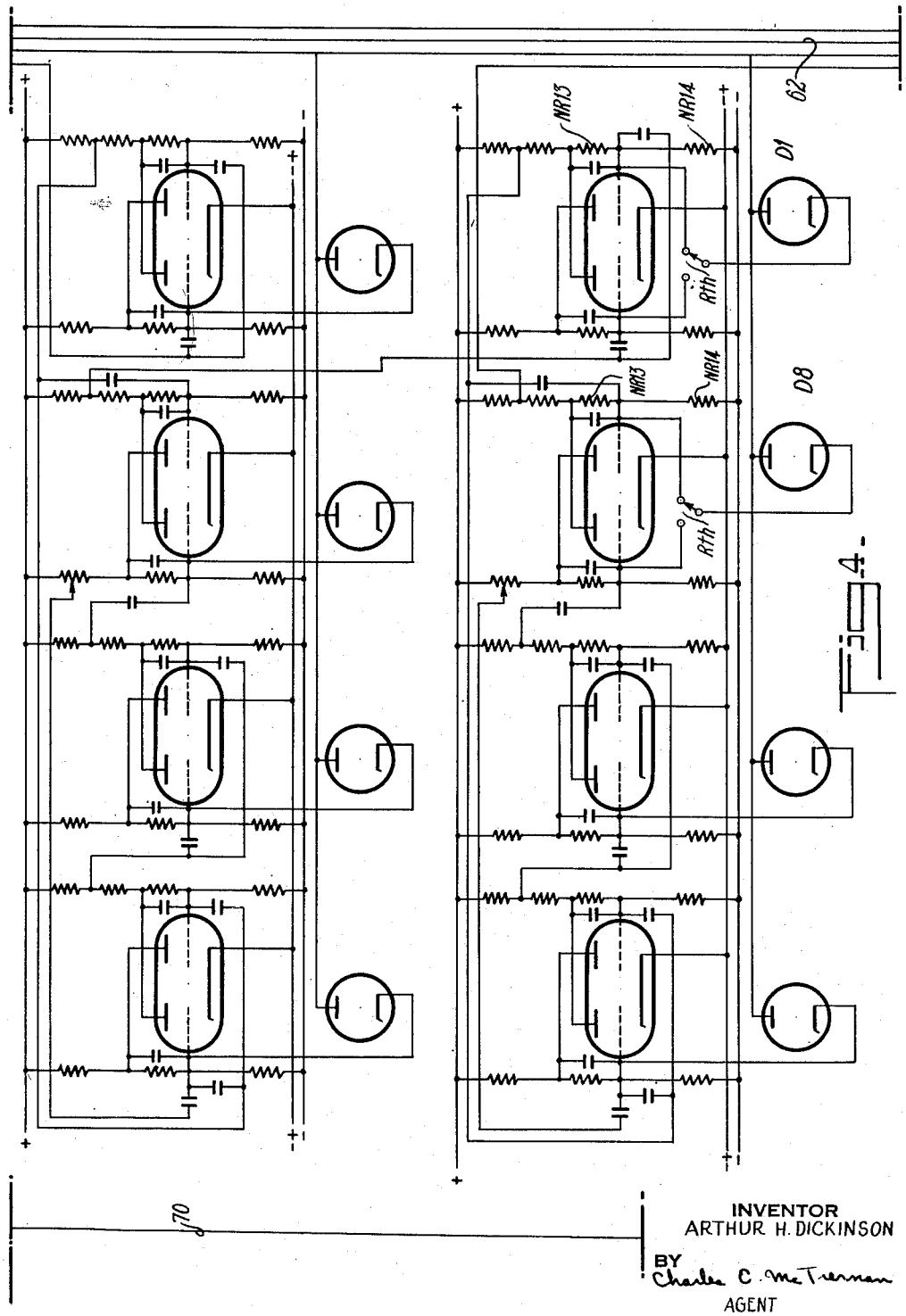
Fig. 4 represents a circuit arrangement showing the hundreds and thousandths order of the result counter.
Figure 5:
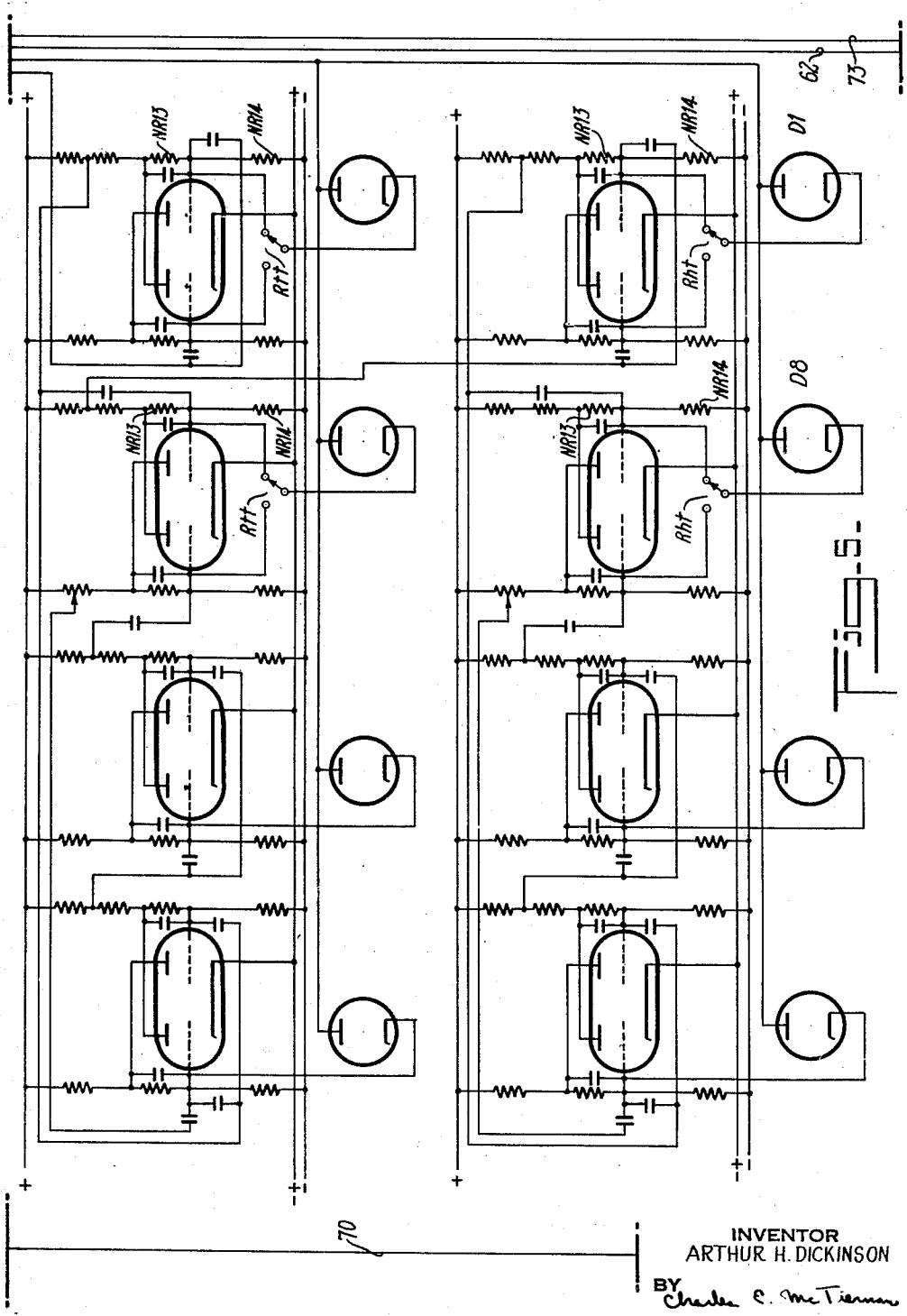
Fig. 5 represents a circuit arrangement showing the ten thousandths and hundred thousandths orders of the result counter.

Prior to the initiation of each measuring cycle it is necessary that the result counter be reset to either –000000– or to the complement of a predetermined count, the significance of which shall be explained subsequently. In Figs. 3, 4 and 5 it is shown that each order of the result counter is provided with four diodes D1, D2, D4 and D8. The anode of each diode is connected to the line 60 which is coupled to the resistor R19, as shown in Fig. 3. The resistor R19 is a cathode follower resistor for the tube V7 with the anode thereof connected to the high side of the 150 volt source and whose control grid is connected to the resistor R20. The other end of each of the resistors R19 and R20 is connected to the low side of the bias voltage supply source whereby the tube V7 is maintained normally at low conduction. Consequently, the anodes of all the diodes D1, D2, D4 and D8 are normally negative with respect to their cathodes regardless of the on and off status of the counter triggers.

In the case of the diodes D1, D2, D4 and D8 employed in the three lowest orders and in the case of D2 and D4 used in the three highest orders, the cathode of the diode connects to the junction between NR10 and NR11 of the trigger circuit related thereto. With regard to the diodes D1 and D8 of the three highest orders, the cathode of the diode connects to the center strap of a transfer switch, such as Rth, Rtt and Rht, as shown in Figs. 4 and 5. With these switches in the position shown, the cathode of each of the diodes D1 and D8, of the three highest orders, is connected to the junction of the resistors NR13 and NR14 of the trigger circuit related thereto. When these switches are in a position reversed to that as shown, the cathode of each of the diodes D1 and D8 is then connected to the junction between the resistors NR10 and NR11 of the trigger circuit associated therewith.

A reset of the result counter is effected by applying a positive impulse to the resistor R20 through the capacitor C8, which is associated with the tube V7, by one of a plurality of circuits to be subsequently described. The positive pulse reduces the negative bias of the tube V7 which, as a result, is rendered more conductive, resulting in a current flow therethrough and through the resistor R19. The resulting positive impulse produced on the resistor R19 raises the anode potential of each of the diodes D1, D2, D4 and D8 at least to the cathode potential of the trigger circuit associated with each diode. When the switches Rth, Rtt and Rht are in a position reversed to that shown positive impulses are applied to all trigger resistors NR11 and if any trigger is on it is switched off. Thus the application of a single positive impulse to the resistor R20 causes a reset of the result counter to –000000–.

There are times when it is necessary to reset the result counter to either –900000–, –990000– or –999000–. When the result counter is to be reset to –900000–, the switches R*tt* and R*th* are reversed from the position shown while the switch R*ht* remains at the position shown. When the result counter is to be reset to –999000–, all the switches remain in the position as shown. When the counter is to be reset to –990000– switches R*ht* and R*tt* are left as shown and the switch R*th* is reversed.

As pointed out previously the operation of the system depends upon the trigger G (Fig. 2) of the gating circuit being rendered conductive so that the impulses from the controlled and fixed oscillators may be applied simultaneously to the respective counters. The initiating negative impulse necessary to render the trigger G conductive is derived from the anode resistor R22 of the tube V8, as shown in Fig. 2, which is coupled to the control grid of the left hand device of the trigger G through the connecting line 61, the resistor R16, the switch S7 in position as shown and the capacitor C7. The control grid of the tube V8 is connected to the resistor R23 which terminates at the low side of the bias voltage power supply. The initiating impulse is produced by one of a plurality of methods to be described subsequently which supplies a positive impulse to the resistor R23 through the capacitor C9 coupled thereto. The positive impulse reduces the negative bias of the tube V8 thereby rendering the tube conducting which, as a result, produces the negative initiating impulse on the resistor R22.

A measuring cycle whereby the result counter is reset to receive impulses from the controlled oscillator CV and the gating circuit CV6 is unblocked may be initiated in several ways. The first of these different ways is a manual operation, the second is repetitive under control of a timing device, and the third is repetitive electronically.

In the manual method the resetting of the result counter is effected by hand. In order to reset the result counter by this method, the switches S5, S6, S7, S8 and S9 remain in the position shown in Figs. 2 and 3 while the key K2 is shifted to a position reverse from that shown in Fig. 3. With the key K2 in the position as shown, the capacitor C8, in the grid circuit of the negative biased tube V7, in maintained completely discharged by virtue of the circuit connection from C8 through the switches S9 and S6, the key K2 and the resistors R32 and R20. When the key K2 is reversed in order to effect a manual reset of the counter, a high potential derived from a voltage divider comprising R33 and R34, as shown in Fig. 2, is applied to the capacitor C8 through the connecting line 63 (Fig. 3). Due to the time constants of C8 and R20, a steep positive pulse appears on R20 thereby reducing the negative grid bias of the tube V7 resulting in V7 being made conductive. The resultant current flow through V7 produces a positive pulse on the R19, which pulse resets the result counter as pointed out in the aforementioned description concerning the operation of the diodes.

In order to unblock the gating circuits CV6 and SV6 so that a measuring cycle may be initiated, the key K1 is shifted to a position reversed to that shown in Fig. 2. Upon reversing the key, a high potential from the voltage divider comprising resistors R33 and R34 is applied through the switch S5 to the capacitor C9, which is in the grid circuit of the negative biased tube V8. The time constants of the capacitor C9 and the resistor R23 are such that a steep positive pulse is produced on the resistor R23 which reduces the negative grid bias of the tube V8 and produces a negative pulse on the resistor R22. This negative pulse is applied to the junction of the resistors R10 and R11 of the trigger circuit G by the conducting line 61, resistor R16, capacitor C7 and the switch S7 whereby the trigger G is rendered conducting thereby unblocking the tubes SV6 and CV6 and thus initiating a measuring cycle.

It is desired many times to make measurements of forces or displacements repetitively at regular intervals and to manifest a result until just before a measuring cycle ensues. For this type of operation the switches S5 and S6 are placed in a position reversed to that shown in Figs. 2 and 3, respectively, thus interrupting the functioning of the keys K1 and K2 while the switches S7 and S8 remain in the position shown. The cams controlling the contacts M1 and M2, shown in Fig. 2, are mounted on a shaft which is rotating, for example, 360 degrees per minute and which is driven by a timing mechanism TM, such as a Telechron motor. With the contacts M1 in the position shown, the capacitor C8 in the grid circuit of the tube V7 is maintained discharged by a circuit which includes the switches S9 and S6, the connecting conductor 64, the contacts M1, the connecting conductor 65 and the resistors R32 and R20. When the contacts M1 are shifted to a reversed position, brought about by the cam action, a high voltage derived from the voltage divider comprising the resistors R33 and R34 is applied by the medium of the wire 63 through the now shifted contacts M1 to wire 64 and the switches S6 and S9 to the capacitor C8 and the resistor R20. As a result a positive pulse appears on the resistor R20 thereby reducing the negative grid bias of the tube V7 which is made conducting thereby producing a positive pulse on the resistor R19 which resets the result counter in the manner previously described.

During this automatic resetting operation, the contacts M2 remain in the position shown thus maintaining the capacitor C9, which is in the grid circuit of the tube V8, discharged by a circuit which includes the switch S5, the conducting line 66, the contacts M2, the conductor 67 and the resistors R35 and R23. Shortly after the result counter has been reset, the cam associated with the contacts M2 causes M2 to shift in position thus applying a high voltage derived from the voltage divider including the resistors R33 and R34 to be applied to the capacitor C9 and the resistor R23 through the connecting line 63, the now shifted contacts M2, the conductor 66 and the switch S5. The resultant positive and negative pulses produced on R23 and R22, respectively, effects the operating of the trigger G thereby unblocking the gates SV6 and CV6 whereby a measuring cycle is initiated. Thus it is noted that the cam controlled contacts M1 cause automatic resetting operations while the cam controlled contacts M2 automatically initiates a measuring cycle.

The preceding method of automatically initiating and effecting measuring cycles is satisfactory where the magnitude of the forces or displacements to be determined are relatively constant.

In order that rapidly changing quantities may be manifested promptly electronic means is provided to automatically effect the operations of resetting and initiating measuring cycles repetitively. In this method, each measuring cycle is followed by a period having a time duration equal thereto for the purposes of manifesting the results. The results are manifested for approximately .8 of the period at which time the result counter is reset. Upon the termination of the period for manifesting the results and for resetting the result counter, another measuring cycle is initiated.

For the operation of the system by this method the switches S7, S8 (Fig. 2) and S9 (Fig. 3) are placed in a position reversed from that shown in the drawings while the position of the switches S5 (Fig. 2) and S6 (Fig. 3) and the manipulation of the keys K1 (Fig. 2) and K2 (Fig. 3) have no effect on the circuit. The reversal of the switch S8 (Fig. 2) places the control grid of the tube SV6 at cathode potential and thus the impulses produced by the fixed oscillator are applied continuously to the standard counter. Assuming a predetermined count of –1000– being applied to the standard or fixed counter, the switch T1000, shown in Fig. 7, is closed and each time the standard counter passes from a count of –999– to –1000– a negative impulse is applied to the conductor 62 and through the switch S7 to the trigger G. Inasmuch as the switch S7 is shifted from the position shown in Fig. 2, the negative impulse is fed concurrently through the resistor R15 and the capacitors C6 and C7 to both sides of the gate trigger G. Accordingly, the trigger G is rendered alternately on and off after each successive count of –1000– has been entered in the standard counter.

During the time interval that the trigger G is off there appears in the result counter a manifestation of the results in digital form. Now proceeding upon the assumption that the trigger G is off, it is noted that the voltage at the junction of the resistors R13 and R14 is at the lower of two potentials. The grid of the tube V10, shown in Fig. 2, is coupled to the conjunction of the resistors R13 and R14 by the conductor 69. Since the gate trigger G is off, the tube V10 is biased beyond cut off and is non-conducting. The tube V10 is connected in parallel with the tube V11, Fig. 2, with the anodes of each tube commonly connected to the high side of the main power supply source through a resistor R37. The grid of the tube V11, with the switch T800 closed, Fig. 7, is connected to the junction of the resistor NR10 and NR11 of the "8" trigger in the hundreds order of the standard counter through the medium of the conductor 70a. Thus the grid bias of the tube V11 depends upon the voltage at the junction of the resistors NR10 and NR11.

During the interval when the count in the standard counter progresses from –0– to –799–, the "8" trigger in the hundreds order of the standard counter is off and the tube V11 is zero biased and highly conductive. As the count in the standard counter passes from –799– to –800–, the "8" trigger is rendered conducting which results in the tube V11 being shut off. At the instant V11 is shut off, a positive pulse is produced on the resistor R37 which pulse is applied to the capacitor C8 and the resistor R20, operably associated with the tube V7, by means of the line 71 and the switch S9 (Fig. 3). The positive pulse appearing on the resistor R20 is applied to the grid of the tube V7 thereby rendering V7 conducting, thus resetting the result counter in the manner previously described.

After the result counter is reset the impulses from the standard oscillator continue to enter the standard counter and when the count passes from –999– to –1000– a negative impulse is applied to the trigger G through the conductor 62 to switch the gating circuit on and thereby initiate a measuring cycle. Throughout a measuring cycle the grid of V10 is maintained at a zero bias, inasmuch as the trigger G is on, thus producing a very substantial drop across the resistor R37. Hence, even though the "8" trigger of the hundreds order of the fixed counter switches on during a measuring cycle, the voltage drop across the resistor R37 is not reduced to a magnitude sufficient to cause an unwanted resetting of the result counter.

The manner in which the aforementioned circuit components combine to determine the value of either a force or the displacement of mechanical members, as represented by an electrical potential, will now be discussed.

Fundamentally the operation of the system described herein centers around the comparison of the frequencies of the controlled and standard oscillators by the counting of impulses produced by each for a predetermined time period in order that the magnitude of a varying force or displacement may be evaluated. The force or the displacement, in the form of an electrical potential, is injected into the controlled oscillator circuit which causes the frequency thereof to vary such that the rate of change of frequency with respect to the force or the displacement, and which is referred to as the control ratio, is a constant. It is to be noted that with a proper design of the resistor R8 that the frequency of the controllable oscillator may be made to follow any desired input variations. The varying force or displacement has no effect on the frequency of the second oscillator which remains constant. Likewise, the quantity to be measured exerts no influence upon the measuring cycle since such is independent of the varying quantity. The impulses generated by each oscillator are continuously applied to a gating circuit which is normally closed. To effect a measurement the gating circuit is opened and the impulses of the controlled and fixed oscillators are applied to the respective counters thereof. When a number of impulses equal to a predetermined amount is entered into the standard counter, the gating circuit is automatically closed. The total number of impulses registered by the result counter during the predetermined count is the digital value of the force or displacement being measured. After reading the result counter it is reset to the original zero position thereof and another measurement of the force can be initiated.

The operation of the system described herein is exemplified by a series of numerical examples. First it is necessary to assume the initial operating data of the systems such as a frequency of 10,000 cycles per second for each oscillator, that a force, such as a potential, is to be measured, that the controlled oscillator has a fixed ratio of 100 cycles per measured volt, that the fixed counter is set for a predetermined count of –1000– and that the result counter is reset to the complement of the predetermined count or 999000.

When a zero force, in the form of an electrical potential, is injected into the controlled oscillator circuit, there is a corresponding change in the frequency of the oscillator pursuant to the relationship existing between the force applied and the frequency of the oscillator which is defined by the control ratio of the oscillator. When a count of 1,000 derived from the standard oscillator stands in the fixed counter, the measuring cycle is automatically terminated and since the controlled oscillator feeds impulses into the result counter at the same rate, the manifested value of the force being measured after .1 of a second of the measuring cycle is

999000+1000=000000

Now assume that a total force equivalent to one volt is to be measured. The injection of the force into the controlled oscillator circuit will shift the frequency thereof from 10,000 cycles per second to 10,100 cycles per second. When a count of 1,000 stands in the standard counter, the measuring cycle is automatically terminated. Since the controllable oscillator feeds impulses into the result counter at the rate of 10,100 cycles per second, the final manifested value of the force appearing in the result counter after .1 of a second of the measuring cycle is

999000+1010=000010 thus providing a measure of the force to the nearest one-tenth of a volt.

The system described herein is applicable also to situations where the force or displacement can be either positive or negative in magnitude. For this example assume that a translational displacement is being measured which has a total travel of one inch and that from 0.00 to 0.50 inch the displacement is negative and that from 0.50 inch to 1 inch the displacement is positive. Also, let it be assumed that the control ratio is now 1000 cycles per measured inch; that is, each incremental .001 inch of displacement causes the oscillator to change one cycle per second in frequency. The normal frequency of the controlled and fixed oscillators is adjusted to be 10,000 cycles per second when the displacement of the object measured is located at one-half of its total travel and which is considered to be zero displacement.

Assume during a measuring cycle that a displacement of +.430 inch which when converted to the electrical potential equivalent thereto is injected into the controlled oscillator circuit resulting in the frequency of the oscillator shifting from 10,000 cycles per second to 10,430 cycles per second. The measuring cycle is terminated when a count of 1000 is entered in the standard counter and since the controllable oscillator feeds impulses into the result counter at the rate of 10,430 cycles per second, the final manifested value of the displacement after .1 of a second of the measuring cycle is 999000+1043=000043 thus providing a measure of the displacement to the nearest one hundredth of an inch.

On the other hand, when a displacement of —.370 inch is applied to the controlled oscillator during a measuring cycle, the frequency of the oscillator shifts from 10,000 cycles per second to 9630 cycles per second. When the measuring cycle is terminated by the predetermined count of 1000 being entered into standard counter and inasmuch as the controllable oscillator feeds impulses into the result counter at the rate of 9630 per second, the final value of the displacement is 999000+963=999963 which is the complement of the value of the measured displacement. The presence of —9— in at least the highest order of the R counter indicates that it is registering a complement and that the magnitude measured is negative.

The result standing in the result counter at the termination of a measuring cycle may be mathematically expressed as follows:

$$A + \frac{f_c}{f_s}(C) = R$$

when A is the value to which the result counter is reset, $f_c$ is the frequency of the controlled oscillator in cycles per second, $f_s$ is the frequency of the standard oscillator in cycles per second, and C is the predetermined count at which the standard counter is set in order that the measuring cycle may be terminated.

It is to be noted that the frequency of the controlled oscillator, $f_c$, is related to a force or displacement as follows:

$$f_n + C_r(F) = f_c$$

or $$f_n + C_r(D) = f_c$$

where $f_n$ is the normal frequency of the controllable oscillator in cycles per second, C is the control ratio which is defined as the change in the controllable oscillator frequency in cycles per second per unit of force or displacement, F is the value of the force being measured, D is the value of the displacement being measured.

The accuracy obtained, by the system described herein, in the measurement of a force or displacement is dependent upon the length of the predetermined count or time interval. Thus when the required accuracy is one part in one thousand, the result counter is reset to 999000 and the predetermined count is adjusted to 1000 by closure of the switch T1000 (Fig. 7). If the accuracy of the measurement is to be one part in ten thousand then the result counter is reset to 990000 and only the switch T10000 (Fig. 7) is closed so that the predetermined count is now 10000. When an accuracy of one part in one hundred thousand is required the result counter is reset to 900000 and only the switch T100000 (Fig. 8) is closed in order to establish a predetermined count of 100,000. The closing of switch T100000 (Fig. 8) would establish an accuracy of one part in one million.

In many instances coefficients must be applied to values of forces or displacements for purposes of utility. One of the features of the system disclosed herein is the ability to measure magnitudes of forces or displacements and to apply coefficients thereto simultaneously and to manifest corrected magnitudes in integral number form.

As previously pointed out, the control ratio of the controllable oscillator, which ratio is a function of the value of the resistances R5, R6 and R7 (Fig. 2) and the transconductance of the tube V3, is the rate of change in the oscillator frequency per volt change in the absolute grid voltage of the tube V3. The control ratio increases as the resistor R5 is increased and as the resistors R6 and R7 are decreased as well as varying directly with any change in the transconductance of the tube V3. Thus the adjustments of the resistors R5 and R7 are usually sufficient to obtain the desired control ratio changes.

In the examples presented heretofore it has been assumed that $$C_r = y(10^x)$$

where $C_r$ = control ratio $y = 1.0$

However, any value may be assigned to $y$ thus making it possible to multiply or divide a force by any desired coefficient, such as a conversion factor, and to manifest the corrected value in digital form.

After adjusting the values of the resistances R5 and R7 of the control tube V3 according to the required coefficient, each result produced in the result counter is represented by the expression $$\pm F(k) = R$$

or $$\pm F/k = R$$

where $F$ = the force measured
$K$ = a coefficient
$R$ = a manifested result.

The feature of the system is illustrated by the following examples set forth in the table below where it is assumed that the predetermined count is 1000, that the result counter is reset to 999,000, that the frequency of the controlled and fixed oscillators is 10,000 cycles per second and that the force (F) being measured is expressed in volts.

$k = 1.00$ in $F(k) = R$
$C_r = 100$ cycles/volt
$k = 3.00$ in $F(k) = R$
$C_r = 300$ cycles/volt
$k = \dfrac{1}{1.666}$ in $F/k = R$
$C_r = 60$ cycles/volt

| F | $f_c/f_s$ | R | $f_c/f_s$ | R | $f_c/f_s$ | R |
|---|---|---|---|---|---|---|
| 1 | 1.010 | 000010 | 1.030 | 000030 | 1.006 | 000006 |
| 2 | 1.020 | 000020 | 1.060 | 000060 | 1.012 | 000012 |
| 3 | 1.030 | 000030 | 1.090 | 000090 | 1.018 | 000018 |
| 4 | 1.040 | 000040 | 1.120 | 000120 | 1.024 | 000024 |
| 5 | 1.050 | 000050 | 1.150 | 000150 | 1.030 | 000030 |

Thus it is noted from the aforementioned table that each force measured is multiplied or divided by a constant or coefficient during such measurement and that the desired corrected result is manifested.

Figure 9:
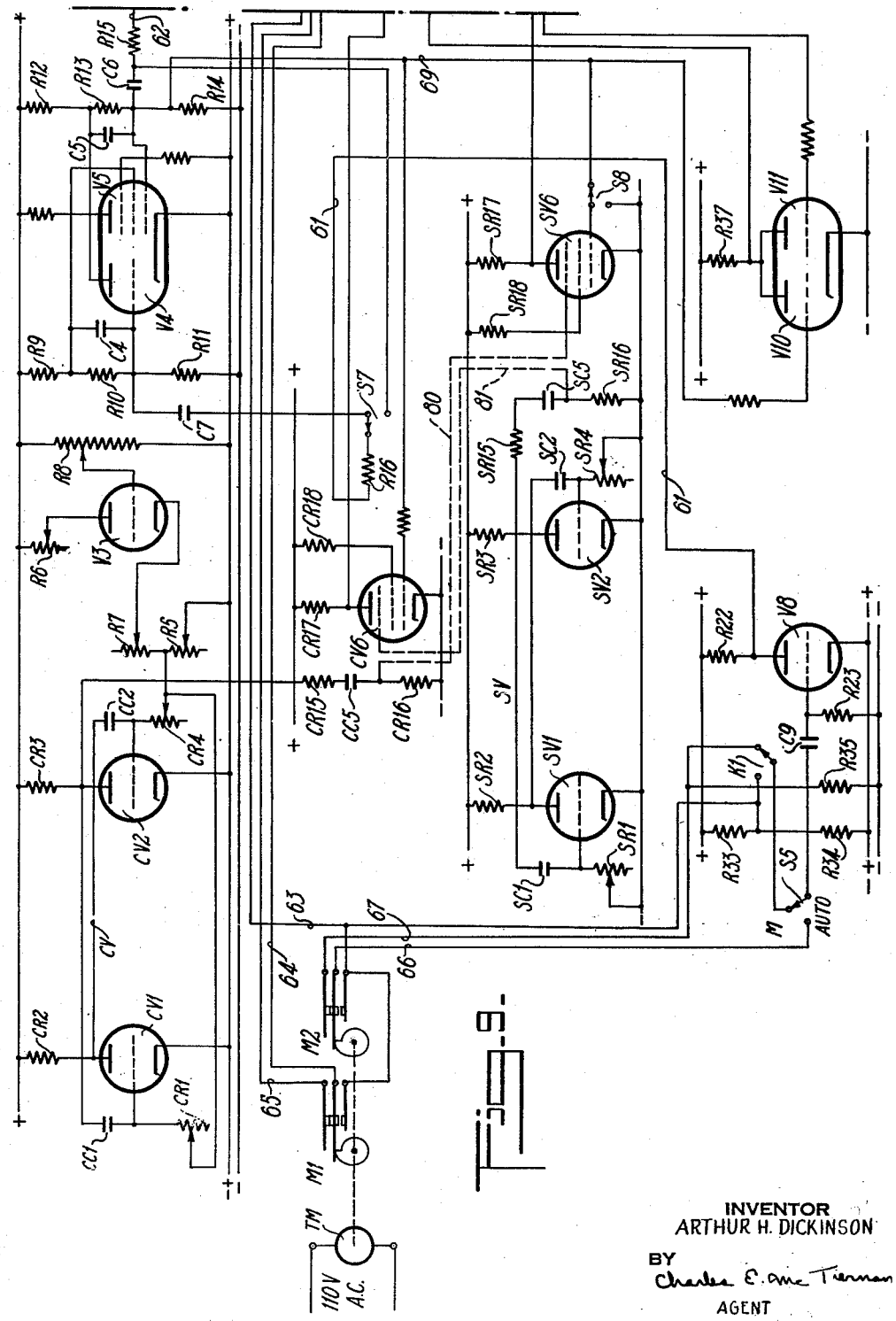
Fig. 9 represents a modification of the main embodiment of the invention showing a circuit arrangement whereby the independent quantity is manifested as a functional value thereof.

A modification of the main embodiment of the invention is shown in Fig. 9 wherein a non-digital independent variable is evaluated and manifested in digital form in accordance with a functional relationship. In this form of the invention the output of the controlled oscillator is continuously applied to the suppressor grid of the tube SV6 by a circuit which includes the resistors CR15 and CR16 and the blocking capacitor CC5 and the connecting line 80. The standard or fixed oscillator continuously applies impulses to the suppressor grid of the tube CV6 through a circuit including the resistors SR15 and SR16 and the capacitor SC5 and the connecting line 81. The remaining circuit connections are similar to those for the main embodiment of the invention.

In the circuit of Fig. 9, the frequencies of the controlled and standard oscillators are compared to evaluate the reciprocal of a continuously varying independent quantity. The result counter directly manifests the value of the reciprocal without the necessity of resorting to conversion factors to give such value meaning and utility.

The principles of operation of this modification are now exemplified by the following example. Let it be assumed that the normal frequency of the fixed oscillator is 1000 cycles per second while the controllable oscillator is adjusted to operate also at 1000 cycles per second when 10 volts, derived from the resistor R8 is applied to the grid of the control tube V3 with the 10 volts being representative of 10 in the continuously varying computing system, and that the independent variable, whose reciprocal is to be determined, is represented by an electrical potential of 15 volts. Assume further that the control ratio is 100 cycles per measured volt that the predetermined count is 1000 and that the result counter is reset to 000000. Accordingly, when the independent variable of 15 volts is applied to the control tube of the controllable oscillator there is a resulting shift in the frequency thereof to 1500 cycles per second. When a count of 1000, which is derived from the controllable oscillator, stands in the standard counter, the measuring cycle is terminated in the manner previously described and inasmuch as the standard oscillator feeds impulses into the result counter at the rate of 1000 cycles per second, the final manifested value of the reciprocal is 000000+000666 thus providing the reciprocal of .0666 of the independent quantity 15.

Figure 10:
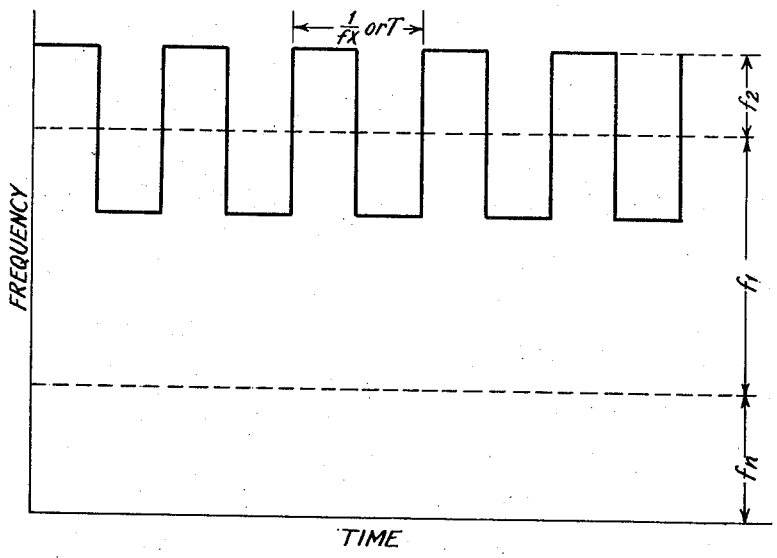
Figure 10 is a graph showing three frequency components plotted against time which are produced by the modulating of a controllable oscillator by a fluctuating force in the form of a variable potential which comprises a steady alternating component.

As mentioned previously, the systems described herein are capable of determining the average magnitude of the unknown forces under consideration. In those situations wherein it is desired to obtain the average value of a fluctuating force, the digital representation of such a value is obtained with a high degree of accuracy. In the determination of the average value the oscillator CV of Fig. 2 is frequency modulated by a fluctuating force in the form of a varying potential which comprises a steady component and an alternating component which are impressed upon the operating or normal frequency component of the oscillator. These three frequency components are plotted against time in Fig. 10 wherein $f_n$ is the normal frequency of CV when no signal is impressed upon the control tube, $f_1$ is the increase in frequency due to an increase in the steady component while $f_2$ is the variation in frequency due to the alternating component where the variation of the frequency component $f_2$ is assumed to be a square wave having a frequency $f_x$ or a period T. Thus it is noted from Fig. 10 that the impulses from the controllable oscillator enter the result counter at successive higher and lower rates than that which would occur prior to the application of the alternating component $f_2$ to the components $f_n$ and $f_1$. Now if the measuring cycle were to commence and end at like phases of $f_x$ then the count applied to the result counter during the period T would be:

$$N_T = f_1 T + \frac{f_2 T}{2} - \frac{f_2 T}{2}$$

but it is possible for a measuring cycle to start and stop at unlike phases of $f_x$ in which event the value manifested in the result counter will differ from the true average. In those situations where the measuring cycle starts and stops at unlike phases of $f_x$, the maximum possible error E in the count would be:

$$E = \pm f_2\left(\frac{T}{2}\right)$$

but $$T = \frac{1}{f_x}$$

and since the true count or average $= f_1 T_c$ where $T_c =$ duration of a complete counting cycle then the per cent error $$E = \frac{\pm f_2}{2 f_x}\left(\frac{1}{f_1 T_c}\right) 100$$

Figure 11:
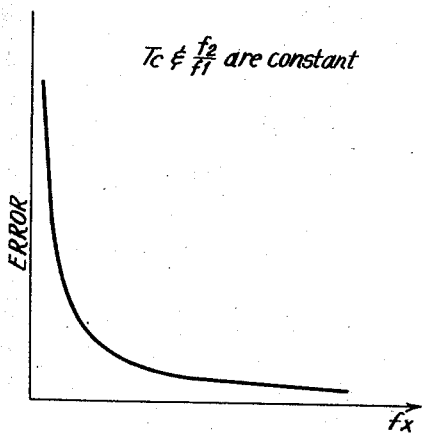
Figure 11 is a graph showing the relationship between the percentage error and the frequency change induced by the fluctuating force.
Figure 12:
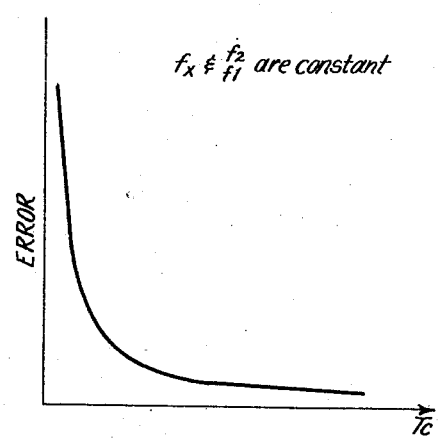
Figure 12 is a graph showing the relationship between the percentage error and the duration of a complete counting cycle during the operation for determining the average magnitude of the fluctuating forces under consideration.

Upon differentiating the equation showing the percentage error and with $T_c$ and the ratio $$\frac{f_2}{f_1}$$

being maintained constant, the resulting equation of $$\frac{dE}{df_x} = \frac{-100 f_2}{2 f_1 T_c (f_x^2)}$$

shows that the error is reduced as the frequency $f_x$ increases such as shown by Fig. 11. Furthermore, if the per centage error equation is differentiated with $f_x$ and the ratio $$\frac{f_2}{f_1}$$

being maintained at a constant value, the resulting equation of $$\frac{dE}{dT_c} = \frac{-100 f_2}{2 f_1 f_x (T_c^2)}$$

shows that the error is reduced when the duration $T_c$ of a measuring cycle increases such as shown by Fig. 12.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a system for measuring the magnitude of a varying non-digital quantity and for manifesting said quantity in digital form comprising a controllable oscillator having a frequency which varies linearly with respect to said quantity, a fixed frequency oscillator, a first electronic counter, a second electronic counter, a normally blocked gating circuit, said controllable oscillator being coupled through said gating circuit to said first counter, said fixed oscillator continuously applying pulses to said second counter, said first counter including a plurality of cascaded electronic trigger stages, an electron discharge device having a control electrode, normally ineffective diode resetting means for each of said stages commonly coupled to said control electrode, means under the control of said second counter for automatically rendering said diode means effective causing said first counter to be reset to an original operating condition, means under control of said second counter for automatically initiating a measuring cycle by unblocking said gating circuit whereby impulses from said controllable oscillator are freely applied to said first counter, means operably coupled with said gating circuit for terminating the application of said impulses to said first counter as determined by said second counter after a predetermined time interval, said first counter manifesting the magnitude of said quantity in digital form after said interval.

2. In a system for automatically and repeatedly measuring and manifesting the magnitude of a varying quantity at regular intervals of time comprising a first oscillator, a first normally blocked gating circuit and a first electronic counter, said oscillator continually applying impulses to said gating circuit, said gating circuit coupled to said counter, the frequency of said oscillator varying linearly with respect to said quantity, a second oscillator, a second normally blocked gating circuit and a second electronic counter, said second oscillator coupled to said second counter through said second gating circuit, the frequency of said second oscillator being fixed, each of said counters operating on a binary notational basis and having a plurality of orders, each of said orders comprising a plurality of operatively connected trigger circuits, each trigger circuit of said first counter having coupled thereto on one side thereof a first non-conducting electron tube, a first means to automatically and repeatedly at regular intervals reset said first counter to an original condition, a second means to automatically and repetitively initiate a measuring cycle, said first means comprising a low conducting electron discharge device, a unidirectional electron tube coupled between each of said triggers and said device, said device while in said low conducting condition being adapted to maintain said tube in a non-conducting condition, means operably coupled to said device for cyclically pulsing said device whereby said device is rendered more conductive, each of said tubes being made conductive when said device is rendered more conductive whereby said triggers are restored to an original indicating position, said second means to initiate a measuring cycle comprising a normally non-conducting discharge device, means for operably coupling said non-conducting device with each of said circuits, means for cyclically rendering said device conductive, said device upon becoming conductive enabling said circuits to be unblocked whereby the output signal of each of said oscillators is freely applied to the respective one of said counters, said second counter having means to terminate said measuring cycle after a predetermined count, said first counter manifesting the value of said quantity in digital form, said resetting operation and measuring cycle occurring in alternate cycles.

3. In a system for automatically and repetitively measuring the magnitude of a non-digital variable quantity and for manifesting said quantity in digital form sequentially comprising a first oscillator having a frequency which varies linearly with said quantity, a normally blocked gating circuit means coupled to said first oscillator, a first electronic counter including resetting means coupled to said gating circuit, a second oscillator having a fixed frequency, a second electronic counter, said second oscillator being coupled to said second counter, said second counter coupled to said resetting means and said gating circuit means, means for automatically and repeatedly resetting said first counter to an original indicating condition upon said second counter registering a first predetermined count, means to unblock said gating circuit upon said second counter registering a second predetermined count thereby initiating a measuring cycle whereby said first counter is responsive to the impulses from said first oscillator, said resetting of said counter and initiating of said measuring cycle occurring in alternate intervals where each interval is equal to said second predetermined count, said first predetermined count being less than said second predetermined count, means nullifying the effect of said first predetermined count during said measuring cycle, means terminating said measuring cycle when a count equivalent to said second predetermined count is entered into said second counter, said first counter manifesting the results of said measuring cycle in digital form, said manifesting period being terminated at the end of said first predetermined count when the resetting operation is repeated.

4. An automatic electronic device for sequentially resetting a first electronic counter to an original indicating condition during a proportional part of a first period, for initiating a second period during which said counter is responsive to input signals, and for manifesting the indications of said counter during the remaining part of said first period where said first and second periods are equal in time comprising a variable frequency means, a fixed frequency means, a second electronic counter, said first and second counter each comprising a plurality of orders with each order comprising four trigger circuits operating on a binary notational basis, each trigger circuit of said first counter having coupled thereto to one side thereof a first non-conducting electron discharge device, said fixed frequency means being continuously applied to said second electronic counter, a normally blocked gating circuit means coupled between said variable frequency means and said first counter whereby the output of said variable means is prevented from being applied to said first counter, said gating means being coupled to said second counter, a second and third electron discharge device having a common plate resistor, said second device rendered non-conducting by said blocking means, said third device being conducting, said resistor coupled to a fourth non-conducting electron discharge device, said fourth device being coupled to each of said first device, said third device being coupled to said second counter, said second counter rendering said third device non-conductive when there is entered into said second counter a first predetermined count whereby there is produced across said resistor a substantial decrease in the voltage drop, said decrease in voltage drop rendering said fourth device conductive thereby making each of said first devices conducting whereby said first counter is reset to an original indicating position, said second counter unblocking said gating means after a second predetermined count which exceeds said first count in time is entered in said second counter whereby said first counter is responsive to said variable frequency means, said second device being rendered conductive when said gating circuit is unblocked thereby increasing the voltage drop across said resistor whereby any unwanted resetting of said first counter is prevented, the responsive period of said first counter being terminated after a time duration equivalent to said second predetermined count is entered into said second counter whereby said gating circuit and said second device is rendered non-conductive, and said third device is rendered conductive, the impulses entered into said first counter during said responsive period being manifested in said first counter for a time equivalent to said first predetermined count, the responsive period of said first counter being equivalent in time to the manifesting and resetting periods, said resetting operation commencing at the end of said first predetermined count to begin a new cycle of operation.

5. In a system for automatically and repetitively determining the measurement of a non-digital variable quantity and for manifesting said quantity in digital form comprising a first oscillator having a frequency varying linearly with respect to said quantity, a normally blocked gating circuit means coupled to said first oscillator, a first electronic counter including resetting means coupled to said circuit, a second oscillator having a fixed frequency, a second electronic counter, said second oscillator being coupled to said second counter, means for coupling said second counter to said resetting means and said gating circuit means, means responsive to said second counter for automatically and repeatedly measuring said quantity by unblocking said circuit for a first predetermined interval, means for resetting said first counter after the results of said measuring are manifested during a second predetermined interval as determined by said second counter, said first counter being reset after a predetermined count has been registered by said second counter during said second interval, said first and second intervals being equal and alternately occurring, and means for preventing said resetting of said first counter during said first interval.

6. In a system for automatically and repetitively measuring an independent varying quantity and manifesting said quantity as a dependent variable in digital form comprising a controllable oscillator having a frequency which varies linearly with respect to said quantity, a first electronic counter including a plurality of trigger circuits operably coupled with said oscillator, a fixed frequency oscillator, a second electronic counter coupled to said fixed frequency oscillator, means blocking the output of each of said oscillators from being applied to the counter associated therewith, a first electron discharge means being in a low conducting condition, a plurality of resetting means coupled to said trigger circuits and commonly coupled to said first discharge means, there being one resetting means for each trigger circuit, said resetting means being ineffective when said first discharge means is in a low conducting condition, means for cyclically rendering the first discharge means more conductive whereby said resetting means becomes effective, said first counter being reset to an original indicating position when said resetting means becomes effective, a second discharge means being in a normally non-conducting position coupled to said blocking means, said second discharge means being ineffective when in a non-conducting position, means for cyclically rendering said second discharge means conductive whereby said blocking circuit becomes unblocked, the output of each of said oscillators being applied to the respective counters thereof for a predetermined interval as determined by said first counter, said second counter manifesting a functional value of said quantity in a digital form at the end of such interval.

7. In a system for automatically and repetitively measuring the magnitude of a non-digital variable quantity and for manifesting said quantity in digital form in alternate cycles comprising a first oscillator having a frequency varying linearly with respect to said quantity, a normally blocked gating circuit means coupled to said first oscillator, a first electronic counter including resetting means coupled to said circuit, a second oscillator having a fixed frequency, a second electronic counter coupled to said second oscillator, means for coupling said second counter to said resetting means and said gating circuit means, means controlled by said second counter for automatically and repeatedly initiating a measuring cycle by unblocking said circuit, means for manifesting the results of said measuring cycle, and means controlled by said second counter for automatically and repetitively resetting said first counters after said manifestation.

8. Indicating means in which a quantity is measured during first and alternate cycles and manifested during second and alternate cycles comprising a first oscillator having a variable frequency output, trigger circuit means having an "on" and "off" position, said circuit means being "on" during a measuring cycle and "off" during a manifesting cycle, a first electronic counter, said first oscillator being coupled to said first counter through said circuit means, a second oscillator having a fixed frequency output, a second electronic counter, said fixed frequency output being continuously applied to said second counter, said trigger circuit being alternately rendered "on" and "off" when a first predetermined count is entered in said second counter, control means for resetting said first counter during a manifesting cycle when a second predetermined count is entered in said second counter, and means regulated by said trigger means for rendering ineffective said control means during a measuring cycle thereby preventing an unwanted resetting during said measuring cycle.

9. A circuit for resetting to a preset count a chain of trigger circuits of the type wherein each trigger circuit has two stable conditions, and a pair of electron discharge devices each having a grid electrode, means for applying a voltage pulse to said trigger circuit for resetting said trigger circuit to a predetermined count, said reset circuit comprising a cathode follower tube upon which reset impulses are impressed, a plurality of diodes, each of said diodes being selectively coupled to the corresponding one of said trigger circuit and the output of said cathode follower, and means to apply a bias to said cathode follower to maintain said diodes non-conductive except during reset, said selective coupling causing said reset pulses to be applied to said electrode of one of said devices for presetting the corresponding circuit to one predetermined count, and to said electrode of the other of said devices for presetting the associated circuit to a second predetermined count.

10. In an electronic binary counter, the combination of, a chain of trigger circuits of the type wherein each trigger circuit has two stable conditions, means for applying a voltage pulse to said trigger circuit to reset said trigger circuit to one of a plurality of preset counts, said reset circuit comprising a cathode follower tube upon which reset impulses are impressed, a plurality of rectifiers, each of said rectifiers being selectively coupled to the corresponding one of said trigger circuit and the output of said cathode follower, and means to apply a bias to said cathode follower to maintain said rectifiers non-conductive except during reset.

11. A circuit for resetting a chain of trigger circuits forming an electronic counter to a preset condition wherein each trigger circuit has two stable conditions, and a pair of electron discharge tubes each having a grid electrode, means for selectively applying a voltage pulse to each said grid electrode to reset said trigger circuit to one of two preset conditions, said reset circuit comprising a cathode follower tube upon which reset pulses are impressed, a plurality of rectifiers, each of said rectifiers being selectively connected between the grid of the tube in each of said pair of tubes to which it is desired to apply a reset pulse and the output of said cathode follower, and means to apply a bias to said cathode follower to maintain said rectifiers non-conductive except during reset.

12. A circuit for resetting a chain of trigger circuits of the type wherein each trigger circuit has two stable conditions, one of which is a starting condition, an electron discharge tube having a grid electrode to which a voltage pulse is applied to reset said trigger circuit to its starting condition, and an impedance for coupling said grid electrode to a point of fixed potential, said reset circuit comprising an impedance the value of which is low when compared with the value of said grid coupling impedance, a plurality of unilateral impedances, each of said unilateral impedances being coupled between the grid of the tube in each of said trigger circuits to which it is desired to apply a reset pulse and said low value impedance, means to apply reset pulses to said low value impedance, and means to apply a bias to said unilateral impedances through said low value impedance to have said unilateral impedances and said low value impedance appear to said grids to have an impedance value which is high when compared to said grid coupling impedance and an impedance value which is low during reset.

13. A circuit for resetting a chain of trigger circuits of the type wherein each trigger circuit has two stable conditions one of which is a starting condition and each trigger circuit includes an electron discharge tube having a grid electrode to which a voltage pulse is applied to reset said trigger circuit to its starting condition and an impedance for coupling said grid electrode to a point of fixed potential, said reset circuit comprising an impedance the value of which is low when compared with the value of said grid coupling impedance, a plurality of rectifiers, each of said rectifiers being connected between the grid of a tube in each of said pair of tubes to which it is desired to apply a reset pulse and said low value impedance, means to apply reset pulses to said low value impedance, and means to apply a bias to said rectifiers to maintain said rectifiers non-conductive except during reset.

14. A circuit for resetting a chain of trigger circuits of the type wherein each trigger circuit has two stable conditions one of which is a starting condition, and an electron discharge tube having a gride electrode to which a voltage pulse is applied to reset said trigger circuit to its starting condition, said reset circuit comprising a cathode follower tube upon which reset pulses are impressed, a plurality of rectifiers, each of said rectifiers being connected between the grid of the tube in each of said pair of tubes to which it is desired to apply a reset pulse and the output of said cathode follower, and means to apply a bias to said cathode follower to maintain said rectifiers non-conductive except during reset.

15. A circuit for resetting a chain of trigger circuits of the type wherein each trigger circuit has two stable conditions, one of which is a starting condition, and an electron discharge tube having a grid electrode to which a voltage pulse is applied to reset said trigger circuit to its starting condition, said reset circuit comprising a cathode follower tube having grid, cathode and anode electrodes, a load impedance, connected to said cathode follower cathode, a plurality of diodes each having an anode and a cathode, said diodes' anodes being connected to said cathode follower cathode, each of said diodes' cathodes being connected to a grid of the one of each pair of tubes to which it is desired to apply a reset pulse, and means to apply a bias to said cathode follower cathode to maintain said diodes' anodes at a lower potential level than said diodes' cathodes, except during reset.

16. A system for automatically and repeatedly measuring and manifesting a non-digital varying quantity in digital form comprising a first oscillator, normally blocked gating circuit and electronic counter with said oscillator coupled to said counter through said circuit, a second oscillator, normally blocked gating circuit and electronic counter with said second oscillator coupled to said second counter through said second gating circuit, the frequency of said first oscillator varying linearly with respect to said quantity, said second oscillator having a fixed frequency, said first counter comprising a plurality of orders where each order comprises four trigger circuits operating on a binary notational basis, means to automatically and repeatedly reset at fixed intervals said first counter to an original indicating condition, said reset means comprising a low conducting electron discharge device, a unidirectional electron tube coupled between each of said triggers and said device, said device while in said low conducting condition being adapted to maintain said tube in a non-conducting condition, means operably coupled to said device for cyclically pulsing said device whereby said device is rendered more conductive, each of said tubes being made conductive when said device is rendered more conductive whereby said triggers are restored to an original indicating position, means to automatically and repetitively initiate a measuring cycle after said first counter is reset whereby each of said gating circuits becomes unblocked, the output of each of said oscillators being applied to the respective counters thereof when said gating circuit becomes unblocked, said measuring cycle being terminated after a predetermined count has been entered in said second counter, said first counter at the end of said cycle indicating the digital value of said quantity, said first counter being restored to the original condition thereof by said automatic resetting means ready to receive another measuring cycle.

ARTHUR H. DICKINSON.

References Cited in the file of this patent

UNITED STATES PATENTS

| Number | Name | Date |
|---|---|---|
| 1,916,782 | Crossley | July 4, 1933 |
| 2,176,742 | La Pierre | Oct. 17, 1939 |
| 2,407,320 | Miller | Sept. 10, 1946 |
| 2,426,721 | Adams | Sept. 2, 1947 |
| 2,516,189 | Dinsmore | July 25, 1950 |
| 2,521,789 | Grosdoff | Sept. 12, 1950 |
| 2,539,673 | Peterson | Jan. 30, 1951 |